Figure 1:
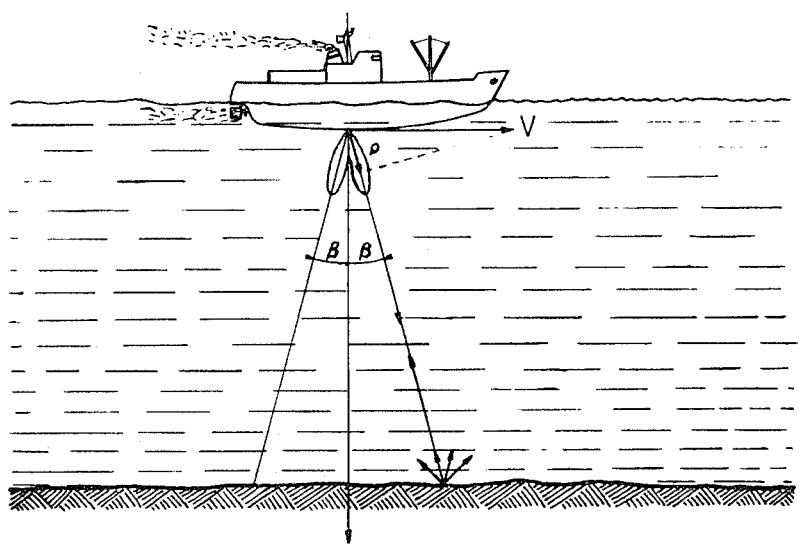

United States Patent [19]

Barret et al.

[11] 3,745,520
[45] July 10, 1973

[54] METHOD FOR DETERMINING THE DISTANCE TRAVELLED OVER BY A VEHICLE WITH RESPECT TO A REFERENCE SURFACE AND DEVICE FOR PRACTISING SAID METHOD

[75] Inventors: Jean-Pierre Barret, Chambourcy (Yvelines); Max Monnot, Chatou (Yvelines), both of France

[73] Assignee: Institut Francais du Petrole, Des Carburants et Lubrifiants, Rueil-Malmaison, France

[22] Filed: June 15, 1971

[21] Appl. No.: 153,347

[30] Foreign Application Priority Data
June 24, 1970 France .................................. 7023489

[52] U.S. Cl. .................. 340/3 D, 340/3 E, 343/7.5, 343/9
[51] Int. Cl. ............................................. G01s 9/68
[58] Field of Search ................... 340/3 R, 3 D, 3 E; 343/7.5, 9

[56] References Cited
UNITED STATES PATENTS
3,271,763  9/1966  Colby, Jr. ........................ 343/7.5 X

*Primary Examiner*—Richard A. Farley
*Attorney*—Craig, Antonelli and Hill

[57] ABSTRACT

Method for determining the distance travelled over by a marine vehicle with respect to the sea bottom comprising transmitting sequentially recognition signals from the vehicle towards the sea bottom along an inclined direction with respect to the latter, detecting the echos thereof, determining the travel time forth and back of said signals, transmitting measuring signals of substantially the same duration as said time interval, measuring the frequency shift between the transmitted signal and its echo and estimating therefrom the distance travelled over by the vehicle.

8 Claims, 5 Drawing Figures

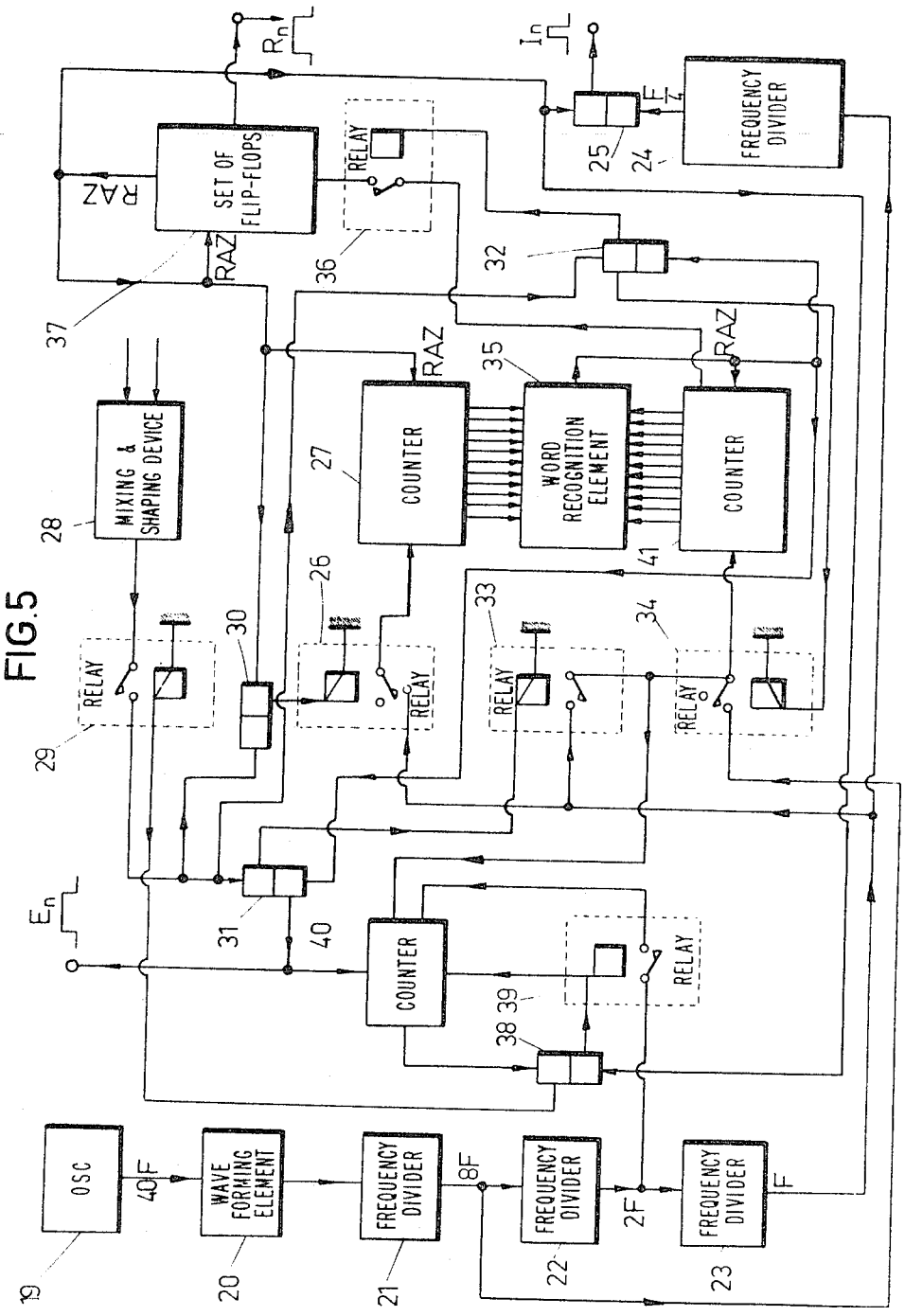

METHOD FOR DETERMINING THE DISTANCE TRAVELLED OVER BY A VEHICLE WITH RESPECT TO A REFERENCE SURFACE AND DEVICE FOR PRACTISING SAID METHOD

This invention relates to the determination of the distance travelled over by a vehicle with respect to a reference surface, by making use of informations concerning its velocity as obtained by measuring frequency shifts of acoustic or electromagnetic waves resulting from the so-called DOPPLER-FIZEAU effect.

The invention relates more particularly to the determination of the distance travelled over by a vehicle moving in or on water body, with respect to the submerged ground used as reference surface.

The methods for determining the relative velocity of a vehicle with respect to a surface and the distance travelled over by said vehicle are based on the well known DOPPLER effect according to which the relative velocity of a vehicle is proportional to the difference between the frequency of an acoustic wave transmitted from the vehicle and the wave received after reflection on said surface.

Amongst these methods, there can be mentioned those which consist of transmitting in a continuous manner ultrasonic waves of a steady frequency towards the submerged ground and along oblique directions with respect to the vertical line passing through the vehicle.

One or more receiving transducers, which can be interconnected, receive the back-diffused ultra-sonic waves. These receivers are coupled with a device, for measuring the difference between the frequency of the transmitted wave and that of the received wave and determining the velocity and the distance travelled over by the vehicle.

The devices for practising these methods do not work satisfactorily except when the water depth between the vehicle and the water bottom is relatively small. For reasons of bulkiness, the acoustic waves receivers are in most cases placed in the vicinity of the transmitters and accordingly receive secondary and direct waves from the latter. When the acoustic waves diffused back from the bottom are too weakened, they are hidden by and mixed up with said direct waves.

A known method for avoiding these disadvantages consists of transmitting acoustic waves in a discontinuous manner. The transmission time interval is followed with a receiving time interval or receiving gap, during which the receivers detect only the waves diffused back from the bottom.

It is well known that the quality and the accuracy of the measurement of the acoustic waves frequency difference or shift resulting from the Doppler effect are better for a longer measuring time and that accordingly the length of the transmitted acoustic wave trains reaches a maximum value compatible with the water depth between the vehicle and the reflecting surface.

In order to increase as much as possible the transmission time, the transducers transmitting waves along oblique directions with respect to a vertical line are coupled with an altimeter or an echo sounder for determining the vertical distance from the vehicle to the reference surface. From said distance there can be deduced the length of the travel paths along the propagation oblique directions, being known the inclination angle thereof with respect to a vertical line. The transmission time is then made proportional to the length of the calculated paths. Moreover, such a method does not take into account the dip, if any, of the reference surface, or local ground features thereof, resulting in variations of the distances along oblique directions which cannot be forecast when using methods for measuring the distance along a vertical direction.

Since the distances along oblique directions are not known with accuracy, it may occur, at the location of the transducers, an overlapping between the end of the transmitted wave trains and the beginning of the reflected wave trains, which is detrimental to the quality of the measurements.

It is an object of the present invention to provide for a navigation method making use of the DOPPLER effect and whereby can be avoided the above-mentioned disadvantages, and a device adapted to the particular requirements for practising the method.

The method according to the invention consists of measuring the distance travelled over by a vehicle, with respect to a reference surface, during successive cycles, each comprising a transmission period and a reception period.

During the transmission period, there are transmitted measuring signals at a determined frequency towards said surface and along at least one inclined direction with respect to said surface. During the reception period, the space travelled over by the vehicle is estimated on the basis of the difference between the frequency of the transmitted measuring signals and the frequency of their echos.

This method comprises transmitting a recognition signal along an inclined direction, determining the time interval between the transmission instant and the instant of reception of the back-diffused recognition signal, and transmitting measuring signals over a period substantially equal to said time interval.

In this way, the emitted pulses duration is kept to a maximum value compatible with the length of the actual distance travelled over by the acoustic waves along the emission and reception directions.

The determination of the travel time forth and back of the acoustic waves, the transmission of the signals used for measuring the Doppler frequency difference and the reception of the echo of the pulse being all carried out in the same direction, these successive operations may be performed with the use of a single transmitting-receiving transducer.

One of the particular features of the invention consists, for example, in measuring at each cycle the frequency difference resulting from the Doppler effect during a time interval longer than the transmission period, on the basis of signals detected during an actual detection time interval selected at most equal to the transmission time.

The fact that the measurement can be effected on a time interval much longer than the actual detection interval will increase the accuracy of the measurement as well as the signal to noise ratio. This feature is advantageous when the distance from the vehicle to the reference surface is short and accordingly the actual detection time, dependent on the transmission time, is very short.

Figure 2:
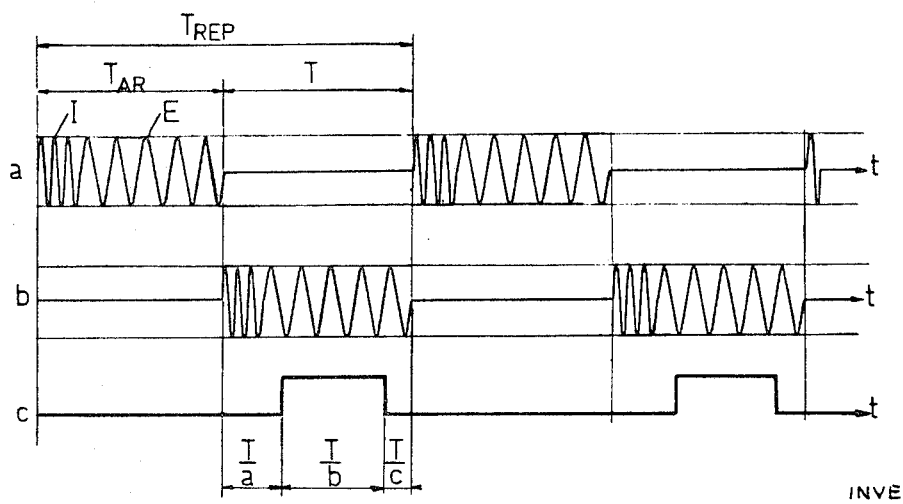
Figure 3:
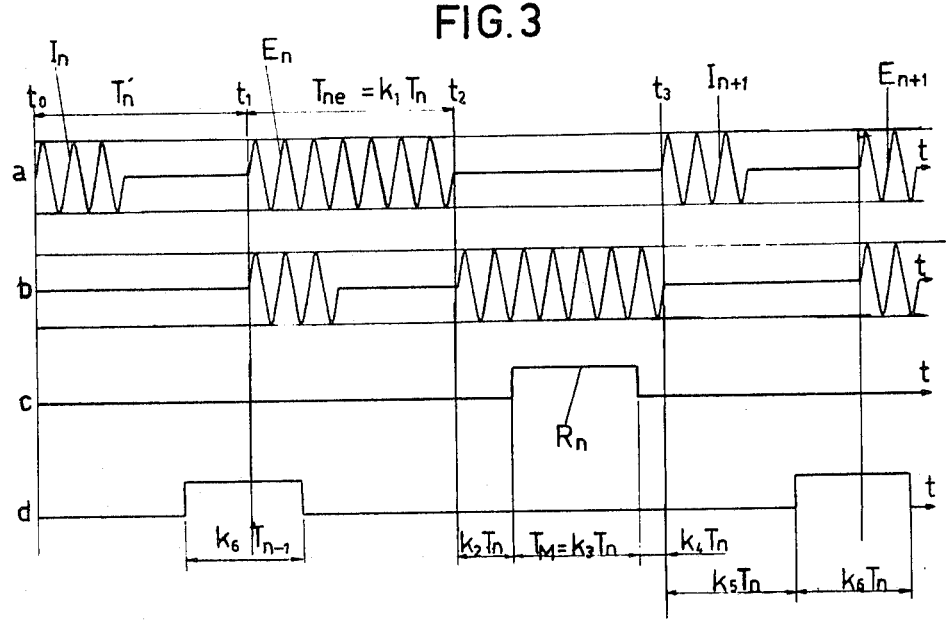
Figure 4:
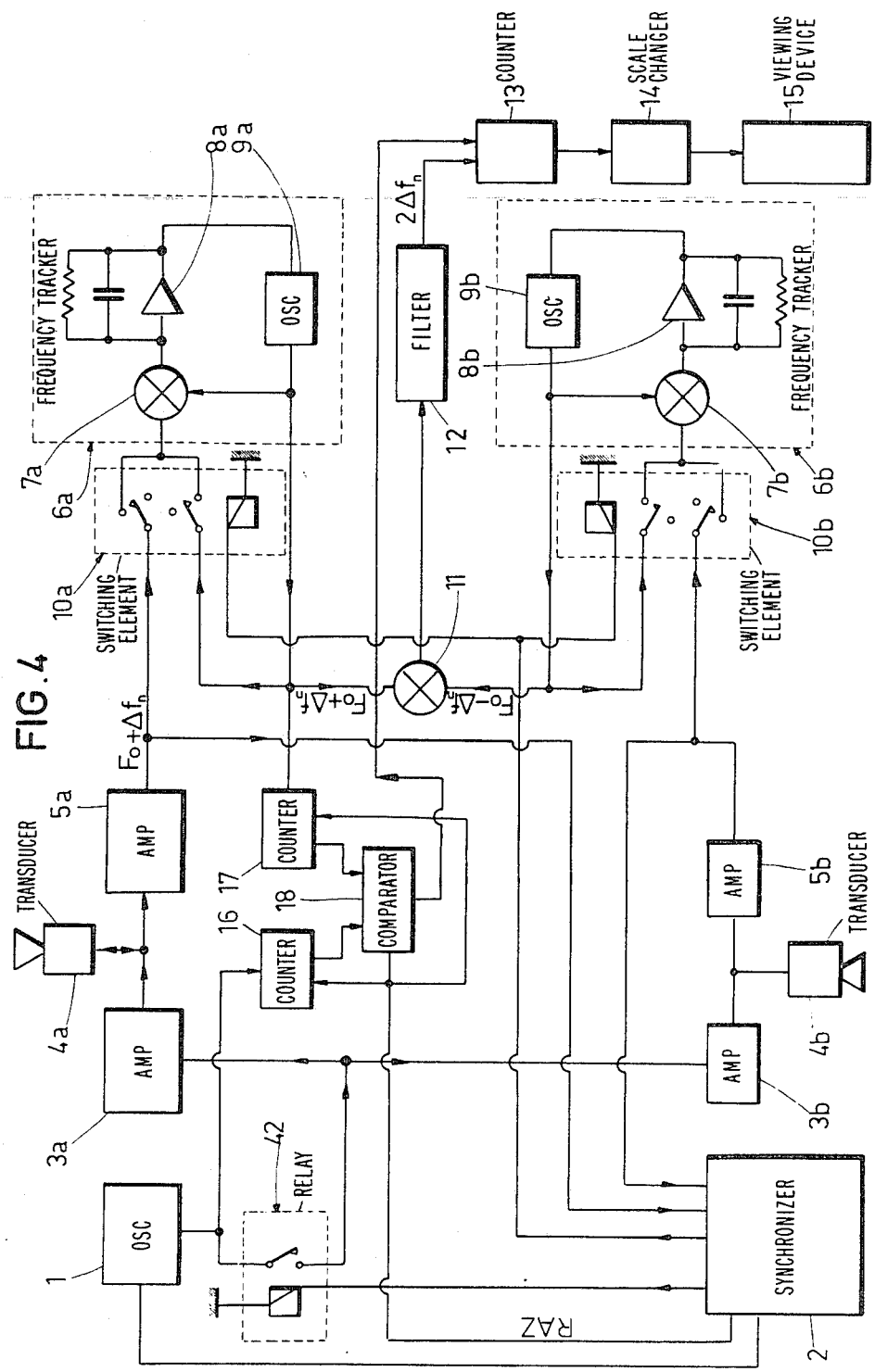

Other advantages obtained by the use of this method as well as remarkable features of the device for performing the same, will be made apparent from the following description, given with reference to the accompanying drawings wherein:

FIG. 1 shows the position of the transmission axes with respect to a vehicle when the method is used for a marine vehicle, FIG. 2 shows the chronograms of a transmission and reception cycle according to a first embodiment of the method, FIG. 3 shows chronograms of a transmission and reception cycle according to a second embodiment of the method, FIG. 4 diagrammatically shows the device for performing said second embodiment of method, and FIG. 5 diagrammatically shows an element for the automatic synchronization of the various operations performed by said device.

In FIG. 1 there is shown a vehicle comprising two transmitting-receiving devices, secured, for example to the hull. The axes of the acoustic wave transmitting-receiving transducers are, for example, in a vertical plane passing through the longitudinal axis of the vehicle and directed along symmetrical oblique directions inclined by an angle $\beta$ with respect to the vertical line. By such a known arrangement the effect of the pitching on the steadiness of the measurements can be reduced.

According to the first embodiment of the method illustrated in FIG. 2, the transmission step is performed simultaneously with the step of measuring the travel time forth and back of the acoustic waves. The transmission step comprises transmitting a wave train E preceded by a short pulse I having a frequency different from that of the wave train (diagram a of FIG. 2). This short pulse is called hereinafter "tonality signal". The transmission is discontinued when the echo-signal is sensed by the transmitting-receiving transducer. This tonality signal may have a single frequency or a composite frequency, obtained by frequency combination or modulation and so selected that the signal can be easily recognized.

The time interval between the beginning of the transmission of the tonality signal and the leading edge of the echo thereof defines the travel time forth and back ($T_{AR}$) of the waves along the transmission axis.

The echo of the transmitted signal is received by the transducer during a time interval T substantially equal to $T_{AR}$ (see diagram b of FIG. 2). The device for measuring the frequency shift is however not connected to the wave receiving device as soon as the tonality signal is received.

After a time interval T/a (with $a > 1$) sufficient for receiving the entirety of the tonality signal (diagram C of FIG. 2), the measuring device is connected during a time interval T/b (with $b > 1$).

During said interval there is counted the difference between the accrued number of cycles respectively at the transmission frequency and at the reception frequency. The result of this counting is proportional to the distance travelled over by the vehicle during the measuring time interval T/b. This measuring interval T/b is followed by a waiting time interval T/c (with $c > 1$) so selected that:

$$T/a + T/b + T/c \leq T \quad (1)$$

the measuring time interval or "measuring gap" being therefore inside the reception time interval T.

A constant ratio is maintained between the transmission time and the measuring gap time interval, resulting in a constant ratio between the latter and the recurrence time interval $T_{REP}$ of the transmission-reception cycles.

The interval $T_{REP}$ is defined by the relationship:
$$T_{REP} = T_{AR} + T = 2\ T \quad (2)$$

The ratio between the measuring time interval and the interval $T_{REP}$ is equal to ½b.

According to a second preferred embodiment of the method of the invention, illustrated in FIG. 3, each transmission and reception cycle comprises the following steps:

a. a step of measuring the oblique distance between the vehicle and the bottom along the direction of the one or more transmission axes, comprising measuring the travel time forth and back $Tn$ along this (or these) direction(s), of a short pulse In transmitted at the beginning of each cycle (diagram a of FIG. 3);

b. a proper transmission step comprising transmitting a wave train $En$ at a given frequency, as soon as the echo-pulse of the preceding pulse In is received and during a time interval $Tne$ proportional to the travel time, forth and back, $Tn$ previously measured and memorized (diagram b FIG. 3). The intervals $Tn$ and $Tne$ are inter-related as follows:

$$Tne = k_1 Tn \ (k_1 \text{ being lower than or equal to 1}) \quad (3)$$

At the end of the time interval $Tne$ the receiver is disconnected.

c. a reception step beginning at the end of the transmission period, assuming that the measured distance, along the oblique direction, between the vehicle and the bottom has not changed since the preceding measurement starting from pulse In. After a time interval $k_2 Tn$ ($k_2$ being lower than 1) during which the receiver is disconnected, the latter is switched to the on position during a time interval $T_M$ of activation of the reception circuits, is given by the relationship:

$T_M = k_3\ Tn$ ($k_3$ being lower than 1 ) (diagram c),
and during which there is counted the difference between the number of accrued cycles respectively at the transmission frequency and at the reception frequency from which can be calculated the distance travelled over by the vehicle during said interval.

The waiting interval is necessary for the case where the echo of the transmitted signal $En$ is delayed by a lengthening of the distance along an oblique axis, between the transmission time of a pulse In and the transmission time of said signal due to a sinking of the bottom or to the action of the swell.

The loosening time interval $k_3 Tn$ may be followed by a second optional waiting interval $k_4 Tn$. The coefficients $k_2$, $k_3$ and $k_4$ are so selected that:

$$k_2 + k_3 + k_4 \leq 1 \quad (5)$$

After a time interval of $(1 + k_1 + k_2 + k_3 + k_4)\ Tn$, beginning at the time of transmission of pulse In, a new transmission and reception cycle begins. This new cycle begins with the transmission of a tonality pulse $I_{n+1}$.

This transmission is followed, after a time interval $k_5 Tn$ ($k$ being lower than 1) calculated from the time interval $Tn$, already determined during the preceding cycle, with a watching interval, hereinafter called "watching gap", for a time $k_6 Tn$ ($k_6$ being lower than 1) during which all the reception circuits are in operation (diagram d).

The provision of the waiting interval $k_5 Tn$ avoids, in the reception circuits, the jamming due to a possible delay of the echo of the wave train $E_n$, transmitted during the preceding cycle. When the waiting interval $k_4T_n$ is omitted, pulses such as $I_{n+1}$ are transmitted at the end of interval $k_3T_n$.

The second embodiment of the described method comprises transmitting pulses such as $I_n$, $I_{n+1}$, at each transmission and reception cycle. It would not be however outside the scope of the invention to make use of a single cycle for measuring the distance along an oblique axis for a number $m$ of successive transmission and reception cycles the length of which are adjusted on the basis of this single measuring cycle. This number $m$ may be within the range of from one to 10. In such a case and as illustrated in FIG. 3, the second signal used for measuring the distance travelled over by the vehicle, will be transmitted just at the end of the waiting interval of $k_4T_n$ or, in some cases, at the end of the loosening time interval $k_3T_n$.

The method may also have other interesting applications. Being known the distances between a vehicle and the surface, along two oblique axes symmetrical with respect to a reference axis, e.g. a vertical axis, there can be determined, by triangulation, the average slope of the surface, when the vehicle moves horizontally.

Let $\tau$ and $\tau'$ be the respective propagation times of the waves from the vehicle to the surface along the two axes, the average slope p can be determined by the relationship:

$$p = (\tau - \tau')/(\tau + \tau')$$

Another application would be to determine by the same process the rolling angle of the vehicle, if any, with respect to the horizontal.

The device for carrying out the second embodiment of the method, which is illustrated in FIG. 4, corresponds to the case where the vehicle has two transmitting-receiving transducers oriented along oblique directions symmetrical with respect to a vertical line.

It comprises an oscillator I producing a signal of frequency $f_o$.

The period of this signal may be used as time base in a synchronizer 2 generating the sequence of signals controlling the various operations performed by the device. The oscillator is connected to two amplifiers 3a and 3b through a relay 42 which, during the successive time intervals of transmitting the distance measuring pulses $I_n$, $I_{n+1}$ etc . . . along an oblique axis and signals $E_n$ (FIG. 3), is closed through signals issued from the synchronizer. The amplifiers 3a and 3b are respectively connected to two transmitting and receiving transducers 4a and 4b.

The echos of the transmitted signals, sensed by the transducers, are amplified and filtered in amplifiers 5a and 5b whose band pass is centered on the transmission frequency $f_o$ and has a width compatible with the Doppler frequency differences $\Delta f_n$ to be detected. The signals produced by the amplifiers 5a and 5b have for example respective frequencies of $(f_o + \Delta f_n)$ and $(f_o - \Delta f_n)$. They feed two frequency trackers, respectively 6a and 6b, of a known type, through two switching elements 10a and 10b controlled by the synchronizer 2.

One particular feature of this device consists in the arrangement of the switching elements.

Each frequency tracker comprises in series a phase comparator (7a, 7b), an integrator (8a, 8b) and an oscillator with controlled frequency (9a, 9b), the output of which is connected to one of the inputs of the phase comparator.

The other input of each comparator is connected, during the energization time interval $R_n = k_3T_n$ (FIG. 3) of each switching circuit, to the output of one of the amplifiers 5a, 5b. Outside this time interval, the other input of each comparator is directly connected to the oscillator output 9a, 9b.

Assuming, for example, that the echo of signal $E_n$ (FIG. 3) has a frequency centered on $f_o \pm \Delta f_n$, the frequency tracker 6a will produce a signal of frequency $f_o \pm \Delta f_n$ after a progressive adjustement during the corresponding measuring interval $R_n$. Between two intervals of energization of the switching circuit 10a, the trackers 6a and 6b, operating in closed circuit, memorize the detected frequencies $f_o \pm \Delta f_n$. It suffices to select high time constants for the band-pass filters contained in integrators 8a, 8b. Let $f_o \pm \Delta f_{n+1}$ be the frequencies around which are centered for example, the echos of the next signal $E_{n+1}$ (FIG. 3). Since the recurrence period of the transmission varies in relation with the distance between the vehicle and the reference surface, the frequency shift $\Delta f_{n+1} - \Delta f_n$ may be kept at a low value.

Consequently the frequency trackers are rapidly adjusted to the frequencies of the received signals, even in the case of a short distance between the vehicle and the surface and, therefore, the reception time intervals $R_n$ are short.

It is also noticeable that the band-pass of the filters forming part of the integrators may be chosen very narrow in view of the small extent of the frequency jumps which have to be followed by oscillators 9a, 9b. This results in an increase of the signal-to-noise ratio.

The memorization of the reception frequencies in the frequency trackers 6a, 6b compensates for a temporary disappearance of the echos of the transmitted signals.

Moreover, the arrangement of the frequency trackers in a closed circuit allows the conversion of short signals, received during the reception time intervals, to a permanent signal.

There can be made use of this characteristic by connecting the output terminals of the frequency trackers to the input terminals of a synchroneous demodulator 11 connected to a low-pass filter 12. The latter produces a signal at a frequency $2 \Delta f$, i.e. twice the value of the Doppler frequency shift. It is connected to an adding and substracting counter 13 which counts the number of cycles at frequency $2 \Delta f$ during a time interval equal to the recurrence period of the transmitted measuring signals. The counter 13 may be connected to a scale changer 14, converting the counted number of cycles to an indication of the distance travelled over, expressed in usual units, and also to a viewing device 15 showing the measurement results.

The device according to the invention also comprises a counter 16, connected to the oscillator 1, which counts the number of cycles of a signal at the frequency $f_o$ during a predetermined time interval. A second counter 17, connected, for example, to the output terminal of the frequency follower 6a, counts, during the same time interval, the number of cycles of the signals at the reception frequency. A digital comparator 18, connected to both counters 17 and 18, produces pulses for controlling the addition or substraction by counter 13 respectively when the difference between the transmission and reception frequencies is positive or negative. The counters 16, 17 and the comparator 18 are also connected to the synchronizer 2 which controls their automatic reset to zero at regular intervals.

Finally, the output terminals of amplifiers 5a and 5b are also connected to the synchronizer 2 which thus receives the echos of the pulses $I_n$ measuring the distance along the oblique axis and determines the travel time forth and back of the waves along the transmission axes.

The synchronizer 2 shown in FIG. 5 first comprises an oscillator 19, producing a signal at a frequency 40 F (F being a refence frequency), connected to a wave forming element 20 which converts the signal to pulses. This element 20 is connected to four frequency dividers arranged in series 21, 22, 23, 24, producing at their output pulses at respective frequencies of 8F, 2F, F and F/4. The frequency 40 F may be chosen equal to that used for the transmission. In this case the wave forming element is directly connected to the oscillator 1 (FIG 4).

A flip-flop circuit is connected to the output of divider 24.

At an initial instant of a transmission-reception cycle, the flip-flop 25 is at such a state as to provide a transmission authorization. After a time interval $\Delta t$ from this initial instant, a pulse issued from the divider 24 triggers to the other state the flip-flop 25. The signal produced by said flip-flop, in the form of a rectangular wave, controls the closure of the relay 42 (FIG. 4) and the transmission of the signal $I_n$, measuring the distance along two oblique transmission directions.

The synchronizer also comprises a first relay 26 connecting, at rest position, the output terminal of divider 23 to the input terminal of a digital counter 27. At the initial instant $t_0$ (see FIG. 3) the relay 26 is at rest position and the counter 27 counts the pulses at frequency F.

A device 28, connected to the output terminals of amplifiers 5a and 5b (FIG. 4), amplify, mixes and gives a proper form to the echos of the signals measuring the distance along the oblique axes. The output terminal of said amplifier is connected, through a relay 29, closed at rest position, to one of the input terminals of a flip-flop circuit 30 whose output terminal is connected to relay 26.

The pulse produced by the device 28 and corresponding to the arrival of the echos of the transmitted signals, triggers the flip-flop 30. The latter energizes the relay 26 and stops the counting of the pulses at frequency F in the counter 27.

The device 28 is also connected, through the relay 29, to one of the input terminals of a flip-flop circuit 31 and to one of the input terminals of a flip-flop circuit 32. One of the output terminals of flip-flop 31 is connected to a relay 33, closed in energization period. The closure of said relay connects the output terminal of the frequency divider 23, on the one hand, to the input terminal of an adding and subtracting counter 40. The counter 41 is also connected to the output terminal of divider 21 through a relay 34, closed when energized by a signal issued from the flip-flop 32.

The arrival of the echos of pulses $I_n$ for measuring the distance along an oblique axis triggers the flip-flop 31 which issues, on the one hand, a signal controlling the start of the transmission of the signals for measuring the Doppler frequency difference and, on the other hand a signal for energizing the relay 33 connecting the counter 41 to the output terminal of divider 23. The counter 41 than stores pulses at frequency F. The output terminals of both counters 27 and 41 are connected to a so-called "word recognition" element 35 for detecting the coincidence between the respective number of pulses counted by said two counters.

The output terminal of said element 35 is connected to an input terminal, referenced RAZ, of counter 41 and to a second input terminal of flip-flops 31 and 32.

When the coincidence occurs, the element 35 generates a signal which resets to zero the counter 41 and triggers both flip-flops 31 and 32.

When the coincidence occurs, the element 35 generates a signal which resets to zero the counter 41 and triggers both flip-flops 31 and 32.

The triggerng of flip-flop 31 results in the discontinuation of the transmission of the signal measuring the Doppler effect. The time interval between two triggerings of the flip-flop 31 is thus just equal to the propagation time of the signal measuring the distance along an oblique axis.

The triggering of the flip-flop 32 energizes the relay 34 which thus connects the counter 41 to the output of divider 21, producing pulses at frequency 8 F.

The signal issued from the output terminal of the flip-flop 32 also energizes a relay 36 which, in closed position, connects one of the output terminals of counter 41 to a set of flip-flops 37. The counter issues, after closure of relay 36 by triggering of the flip-flop 32, signals of a period equal to one-eighth of the time interval $T_{ne}$ (FIG. 3) which, in this illustrative embodiment, is selected equal to $T_n$. The set 37, in response to said signals, generates a signal in the form of a rectangular wave authorizing the reception, e.g. $R_n$, the leading edge of which is delayed by a time interval $3 T_n/8$ with respect to the time at which the transmission $E_n$ has been discontinued. This rectangular wave has a duration of $4 T_{n/8}$ and is automatically placed within the time interval delimiting the reception of the echo.

In this particular embodiment the above-defined coefficients $k_1$, $k_2$, $k_3$ and $k_4$ have as respective values 1, 5/8, 4/8 and 1/8.

The signals corresponding to this rectangular wave control the closure of relays 10 $a$ and 10 $b$ (FIG. 4).

When the set 37 has received eight pulses of a period $T_{n/8}$, after closure of the relay 36, at instant $t_3$ (FIG. 3), it issues a signal of general reset to zero which resets the counter 27 and triggers again the flip-flops 25 and 30.

The synchronizer also comprises circuits for discontinuing the reception during a time interval $k_5 T_n$ (FIG.3)

These circuits comprise an adding-subtracting counter 40 whose adding input terminal is connected to the output of divider 23 producing pulses at the frequency F and whose substracting input terminal is connected to the output of divider 22 producing pulses at the frequency 2F, through a relay 39 energized by the signals issued from one of the output terminals of a flip-flop 38.

The adding and substracting orders are fed to the counter 40 by signals issued respectively from the output terminal of flip-flop 31, generating the transmission rectangular waves $E_n$ and from the output terminal of flip-flop 38.

The latter is actuated both by signals issued from counter 40 and by general reset signals issued from element 37.

The counter 40 counts pulses at the frequency F between instants $t_2$ and $t_3$ of each cycle (see FIG. 3) where the flip-flop 31 is triggered.

The pulses for reset to zero issued from element 35 at instant $t_4$ trigger the flip-flop 38 which energizes the relay 39. Pulses at the frequency 2F are counted by the counter 35.

The reset to zero of the latter, occurring at instant $t_4 + T_{n/2}$ ($k_5 = \frac{1}{2}$ in this particular case), generates a signal which triggers again the flip-flop 38.

The relay 29, controlled by a second output terminal of flip-flop 38, is then in open position between two successive triggering instants of the flip-flop 38, i.e. between instants $t_4$ and $t_4 + T_{n/2}$ in this particular case.

For sake of clarity, the switches have been shown in FIGS. 4 and 5 as electro-mechanical relays. It is obvious however that electronic switches can be used as well.

Other changes can also be made to the described embodiments of method and apparatus, according to individual preference or conditions, without necessarily departing from the spirit of this disclosure and the scope of the appended claims.

What we claim as our invention is:

1. A device for determining the distance travelled over by a vehicle moving with respect to a reference surface comprising means for producing signals at given frequencies, means for transmitting said signals along at least one axis inclined with respect to the surface, means for receiving echos of the transmitted signals, means for demodulation of the received signals and means for counting the transmitted signals and the received signals, means for detecting the frequency of the received signals and means for memorizing the value of said frequency of the received signals and further comprising synchronization means for controlling switching means connecting said signal producing means to the transmission means successively during a first time interval and during a second time interval of a duration permanently equal to the propagation time and starting substantially at the beginning of the reception of the echos of the signals transmitted during the first time interval, switching means connecting said detection means to said reception means during a third time interval shorter than and proportional to said propagation time, and switching means connecting the memorization means to said demodulating means from the end of the third time interval to the end of each cycle.

2. A device according to claim 1 further comprising means for comparing the frequency of the transmitted signals to the frequency of the received signals and supplying to a counting apparatus, in response to said comparison, adding or substracting orders according to the sign of the difference of said compared frequencies and means for showing the result of said counting, expressed in the selected units.

3. A device according to claim 1 wherein the synchronization means comprise means for producing signals at reference frequencies, means for amplifying and giving a proper form to the echos of the signals transmitted during said first time interval, connected to said signal reception means, a first counter, connected to the means for producing signals at a first reference frequency, through a first switching element actuated during the time interval between two successive triggerings of a first flip-flop circuit, a second counter, connected to the means for producing signals at the first reference frequency, through a second switching element, during the time interval between two successive triggerings of a second flip-flop circuit, a coincidence detector producing a pulse in response to the detected coincidence between the number of pulses respectively counted in the first and the second counter, a third switching element for connecting said second counter to means for producing a signal at a frequency equal to eight times the first reference frequency during the time interval between two successive triggerings of a third flip-flop circuit, means for generating a signal in the form of a rectangular wave of a duration equal to said third time interval and a general reset pulse at the end thereof, connected to the second counter through a fourth switching element controlled by said third flip-flop circuit, a fifth switching element for connecting said amplification means to the input terminals of the first and second flip-flop circuits, actuated by two successive triggerings of a fourth flip-flop circuit, and adding and substracting counter whose respective terminals for addition and substraction are connected to the means for producing a signal at the reference frequency and to the means for producing a signal at a frequency double of the latter, through respectively the second switching element actuated by two successive triggerings of said fourth flip-flop circuit, a fifth flip-flop circuit connected to the means for producing a signal at a frequency of one fourth of the reference frequency and to the means for producing the general reset pulse, producing a control signal during said first time interval, a seventh switching element for connecting the amplification means to the respective input terminals of said first and second flip-flop circuits and controlled by the fourth flip-flop circuit, the input terminals of the first flip-flop circuit being connected to the first switching element and to the output terminal of the means for generating said pulse for the general reset to zero, the input terminals of the second and the third flip-flop circuits being connected to the first switching element and to the output terminal of the coincidence detector, the input terminals of the fourth and fifth flip-flop circuits being connected to said means for generating said general reset pulse and respectively to an output terminal of the adding and substracting counter at its passage to zero and to an output terminal of the means for producing signals at a frequency of one fourth of the reference frequency, the output terminals of the fourth and second flip-flop circuits being connected to said switching means for the connection of said signal producing means to said transmission means successively during the first and the second time intervals.

4. A method for determining the distance travelled by a vehicle moving with respect to a reference surface, during successive cycles each comprising a step of transmitting measuring signals at a given frequency along at least one direction inclined with respect to said reference surface, a step of receiving echos of the measuring signals reflected from the surface and a step of measuring the Doppler shift between the frequency of the transmitted measuring signals and the frequency of the received echos thereof and estimating therefrom the distance travelled by the vehicle with respect to the reference surface, said transmission step further comprising:

transmitting a recognition signal along said direction, determining a first time interval between the instant of transmission of the recognition signal and the reception time of the echo thereof, and transmitting the measuring signals during a second time interval of a duration substantially equal to said first time interval.

5. A method according to claim 4, wherein the recognition signal is transmitted at each cycle.

6. A method for determining the distance travelled by a vehicle moving with respect to a reference surface, during successive cycles each comprising a step of transmitting measuring signals at a given frequency along at least one direction inclined with respect to said reference surface, a step of receiving echoes of the measuring signals reflected from the surface and a step of measuring the Doppler shift between the frequency of the transmitted measuring signals and the frequency of the received echoes thereof and estimating therefrom the distance travelled by the vehicle with respect to the reference surface said method further comprising:

transmitting a recognition signal along the direction, determining a first time interval between the instant of transmission of the recognition signal and the reception time of the echo thereof, transmitting the measuring signals during a second time interval of a duration substantially equal to said first time interval, and detecting the Doppler shift during each cycle and within a time interval longer than the transmission interval of the measuring signals, on the basis of the signals detected during an actual detection time chosen of a duration at most equal to the transmission interval of said signals and proportional thereto.

7. A method for determining the distance travelled by a vehicle moving with respect to a reference surface, during successive cycles each comprising a step of transmitting measuring signals at a given frequency along at least one direction inclined with respect to said reference surface, a step of receiving echoes of the measuring signals reflected from the surface and a step of measuring the Doppler shift between the frequency fo the transmitted measuring signals and the frequency of the received echoes thereof and estimating therefrom the distance travelled by the vehicle with respect to the reference surface, said method further comprising:

transmitting a recognition signal along said direction, determining a first time interval between the instant of transmission of the recognition signal and the reception time thereof, and performing a sequence of cycles wherein the transmitting and receiving steps related to the measuring signals have a duration substantially equal to said first time interval.

8. A method for determining the distance travelled by a vehicle moving with respect to a reference surface, during successive cycles each comprising a step of transmitting measuring signals at a given frequency along at least one direction inclined with respect to said reference surface, a step of receiving echoes of the measuring signals reflected from the surface and a step of measuring the Doppler shift between the frequency of the transmitted measuring signals and the frequency of the received echoes and estimating therefrom the distance travelled by the vehicle, said method further comprising:

transmitting a sequence of a recognition signal of a substantially constant duration followed by measuring signals whose frequency is different from the frequency of the recognition signal, interruption the transmission of measuring signals substantially at the reception time of the recognition signal echo the duration of the interruption being substantially equal to the transmission duration, and detecting the Doppler shift between the frequency of the transmitted measuring signals and the frequency of the received echoes thereof during a time interval proportional to the duration of the interruption.

* * * * *